United States Patent [19]

Banjo

[11] Patent Number: 5,101,397
[45] Date of Patent: Mar. 31, 1992

[54] METHOD FOR RECORDING SIGNALS/REPRODUCING SIGNALS ON/FROM FILM

[75] Inventor: Hidenori Banjo, Hyogo, Japan
[73] Assignee: Mitsubishi Denki Kabushiki Kaisha, Tokyo, Japan
[21] Appl. No.: 400,672
[22] Filed: Aug. 30, 1989

[30] Foreign Application Priority Data

Oct. 25, 1988 [JP] Japan .................................. 63-267055

[51] Int. Cl.$^5$ ............................................. G11B 7/00
[52] U.S. Cl. ..................................... 369/125; 369/103; 359/3
[58] Field of Search ............... 369/103, 109, 125, 100, 369/121, 117; 365/125, 106; 350/3.61, 35; 346/107 R, 108, 109

[56] References Cited

U.S. PATENT DOCUMENTS

| | | | |
|---|---|---|---|
| 2,595,670 | 5/1952 | Goehner | 369/125 X |
| 3,806,643 | 4/1974 | Russell | 369/125 X |
| 3,865,996 | 2/1975 | Kato | 361/103 X |
| 3,876,990 | 4/1975 | Silverman | 365/125 X |
| 4,012,108 | 3/1977 | Ishii | 365/125 X |
| 4,173,474 | 11/1979 | Tanaka | 350/361 X |
| 4,458,345 | 7/1984 | Bjorklund | 369/125 X |
| 4,603,099 | 7/1986 | Drexler | 369/125 X |

FOREIGN PATENT DOCUMENTS

62-239338 10/1987 Japan .
63-118180 5/1988 Japan .

*Primary Examiner*—Roy N. Envall, Jr.
*Assistant Examiner*—Thang V. Tran
*Attorney, Agent, or Firm*—Rothwell, Figg, Ernst & Kurz

[57] ABSTRACT

A method for recording signals on, and reproducing them from, a film for signal recording and reproduction, in which after coherent light is used to produce interference bands of light in accordance with signals, the interference bands of light are recorded on the film. In reproduction, the reproduction light by the coherent light is projected to an interference band section on the film, and diffractive light produced in the interference band section is detected for signal reproduction. That is, the interference bands of light corresponding to signals are recorded and reproduced. Recording and reproduction, therefore, can be effected with high fidelity and high quality without a change in sound characteristics likely to caused by film condition and an optical system.

10 Claims, 3 Drawing Sheets

METHOD FOR RECORDING SIGNALS/REPRODUCING SIGNALS ON/FROM FILM

BACKGROUND OF THE INVENTION

1. Field of the Invention:

The present invention relates to a method for recording signals on, and reproducing them from, a film suitable for use in recording aural signals on, and reproducing them from, a sound track of a motion-picture film.

2. Description of the Prior Art:

FIGS. 1, 2 and 3 are schematic representations showing a method for recording signals on, and reproducing them from, a conventional film previously introduced in for example "Film Technology, Broadcasting Technical Library" (published by Japan Broadcast Publishing Co., Ltd ). In FIG. 1, numeral 1 is a film, for example a motion-picture film; numeral 2 denotes perforations for carrying the film 1; numeral 3 is an image frame; numeral 4 indicates an optical sound track section provided along the longitudinal direction of the film 1; numeral 16 denotes an arrow indicating the direction of travel of the film 1; numeral 17 denotes a recording light beam with intensity converted from a sound signal, or a recording light signal for recording variations in the surface area of a photosensitive part of the sound track section; numeral 18 denotes a reproducing light beam to be used for the reproduction of sound in the sound track section 4; numeral 14 represents a light detector which converts the reproducing light beam 18 that has passed through the film 1 into an electric signal; numeral 19 is an enlarged view of the sound track section 4 where recording is performed by a variable density recording method; numeral 20 is an enlarged view of the sound track section 4 where recording is performed by a variable area recording system.

In FIG. 2, numeral 4 denotes a magnetic sound track section coated with a magnetic substance; and numeral 21 expresses a magnetic head which records signals on the sound track section and reproduces signals therefrom.

In FIG. 3, numeral 22 is a tape of the same shape as the film; numeral 4 is a wide magnetic sound track section provided between the perforations 2 on both sides of the tape 22; and numeral 21 is a magnetic head which records signals on the sound track section 4 and reproduces signals therefrom.

Next, the operation of the prior art will be explained.

In FIG. 1, in the recording mode, the recording light signal 17 obtained by converting an aural signal is recorded on the sound track section 4 through light exposure. The recording system that converts the aural signal into light intensity is called the variable density system in which, as shown in the enlarged view 19, the strength of a recording light signal is recorded as a variation in the density of the film 1. The recording system in which the aural signal waveform is converted into a variation in the photosensitive surface area of the sound track section 4 is called a variable area system, which records as shown in an enlarged view 20. In the reproduction mode, the reproduction light 18 is projected into the sound track section 4, and the light that has passed through is converted into an electrical signal by the light detector 14.

Next, in FIG. 2, in the recording mode, the aural signal is supplied to the magnetic head 21, for electrically recording the signal on the sound track section 4. In the reproduction mode, the aural signal is magnetically reproduced from the sound track section 4 by means of the magnetic head 21.

In the case of FIG. 3, a tape recorder using a tape 22 of the same shape and size as the film is used as external equipment and aural signals are recorded on, and reproduced from, the wide sound track section 4 by the magnetic head while the tape recorder and the projector are simultaneously driven on the basis of external synchronizing signals that can be obtained by using a tape recorder loaded with a tape 22 of the same shape and size of a film as an external equipment and by counting perforations of a projector film.

According to the conventional method, recording signals on, and reproducing them from, a film are carried out as described above. However, there is a problem, in the case of FIG. 1, that the sound characteristics vary with the type and the method of development of the film 1; the reproduction signal waveform is distorted by halation and flare on the film; and furthermore when a copy is to be reproduced from a master film, the sound characteristics are deteriorated by the aberration of the optical system at the time of copy reproduction. Also in the case of FIG. 2, the magnetic substance coated on the magnetic sound track section 4 is inferior in flatness and in addition since a hard and thick film base is used, the magnetic substance surface is likely to float off from the magnetic head 21, thereby giving an adverse effect to sound quality. Also when reproducing a copy, it is necessary to produce both an optical copy of the image 3 and a magnetic copy of the sound track section 4. Furthermore, in the case of FIG. 3, since the tape 22 is of the same size as the film, the tape recorder to be used must be a large size and costly.

SUMMARY OF THE INVENTION

One of the primary objects of the present invention is to provide a method for recording signals on, and reproducing them from, a film capable of recording signals, such as aural signals and external synchronous signals recording signals on, and reproducing them from, a film with high fidelity.

Another one of the objects of the present invention is to provide a method for recording signals on, and reproducing them from a film having much superior accuracy and performance to conventional methods and which is feasible at a relatively low cost.

A further object of the present invention is to provide a method for recording signals on, and reproducing them from, a film that is capable of being realized in a device of simple and small construction.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the present invention.

To accomplish the above-mentioned objects, in the method of the present invention for recording signals on, and reproducing them from, a film, coherent light is used, and this light is partly branched off after turning on and off its light source in accordance with signals to be recorded, thus producing a phase difference. Thereafter, the light thus branched off flows to meet at a junction, where there is produced an interference band of light according to signals, which is recorded on the film surface. In the reproduction mode, coherent light for reproduction is projected as incident light, into a light interference band section according to signals, thereby detecting a diffraction light caused by the above-mentioned interference band and reproducing it. That is, the method of the present invention for recording signals on, and reproducing them from, a film is for recording and reproducing the interference band of light according to signals with high fidelity without any change in sound characteristics likely to be caused by film condition and the optical system.

DETAILED DESCRIPTION OF THE PREFERRED EMBODIMENTS

Preferred embodiments of the present invention will now be described by referring to the accompanying drawings.

Figure 1:
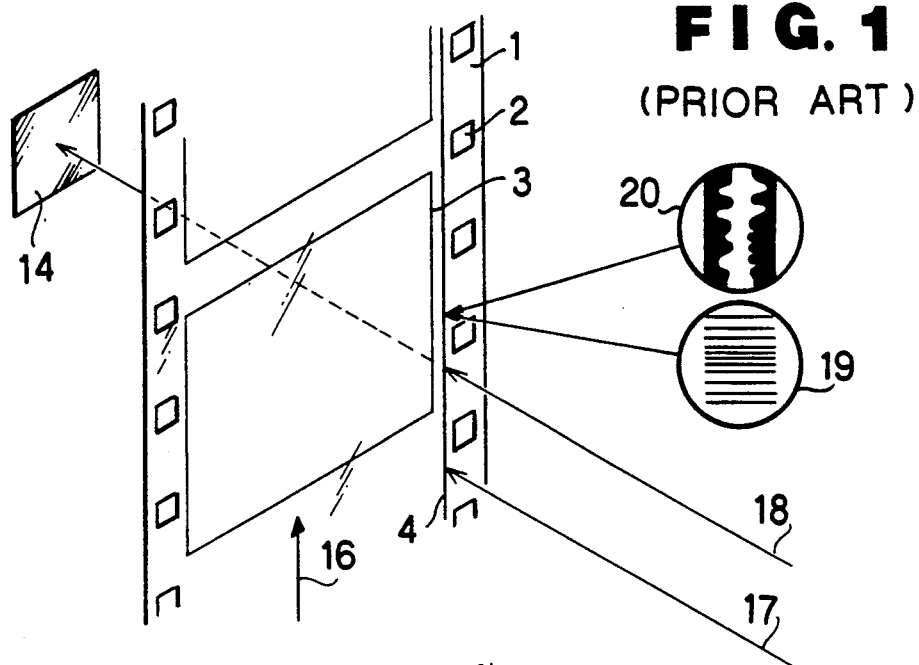
FIGS. 1, 2 and 3 are schematic representations showing a conventional method for recording signals on, and reproducing them from, a film.
Figure 2:
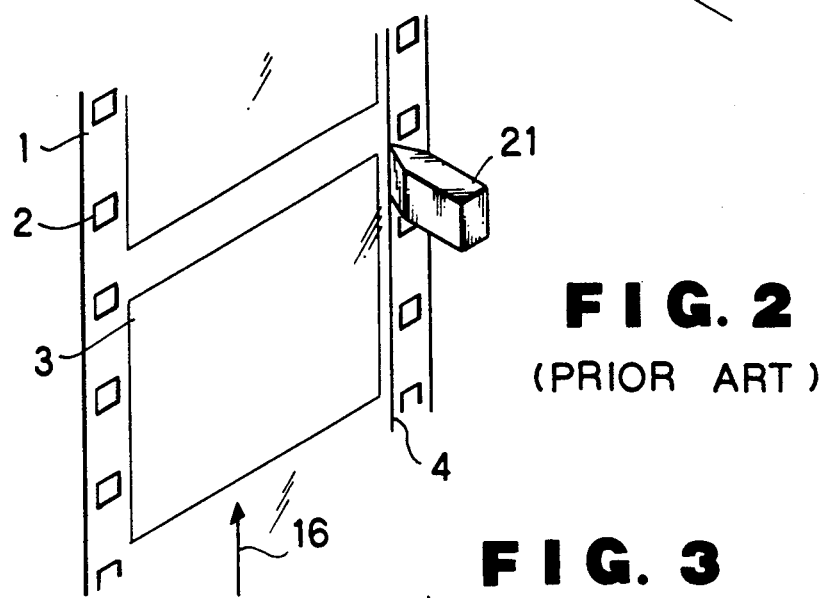
Figure 3:
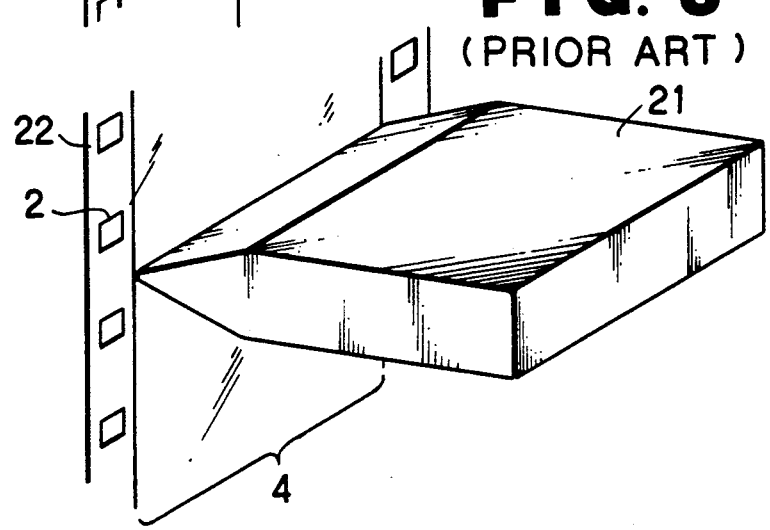
Figure 4:
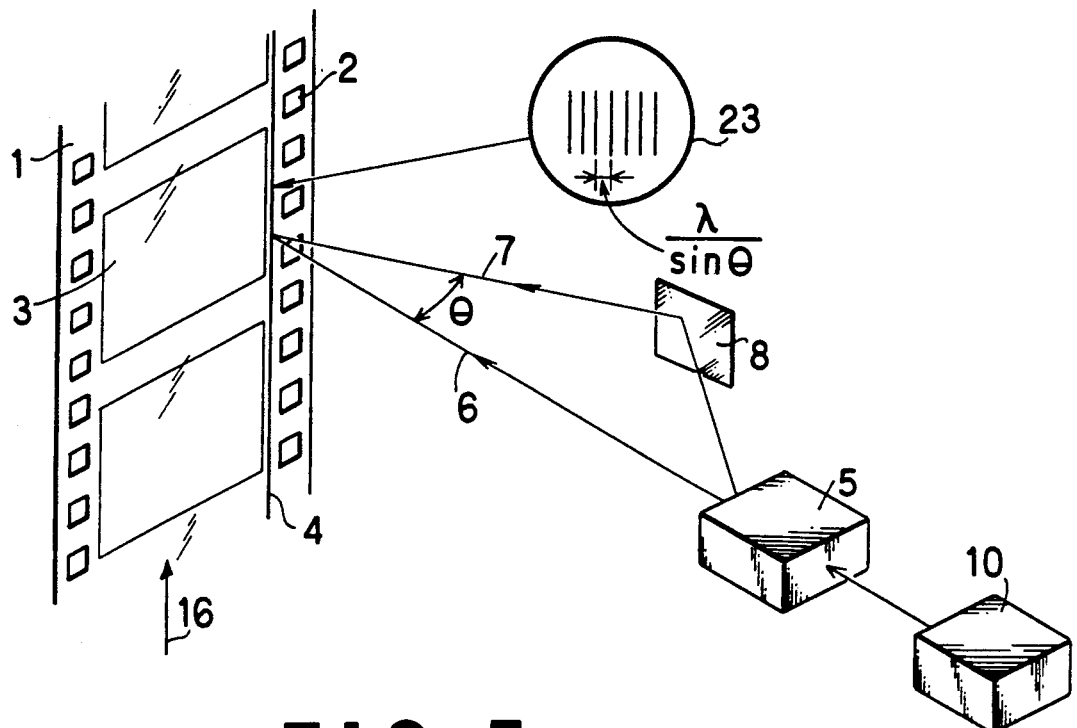
FIG. 4 is a block diagram showing a method according to one embodiment of the present invention for recording signals on a film.
Figure 5:
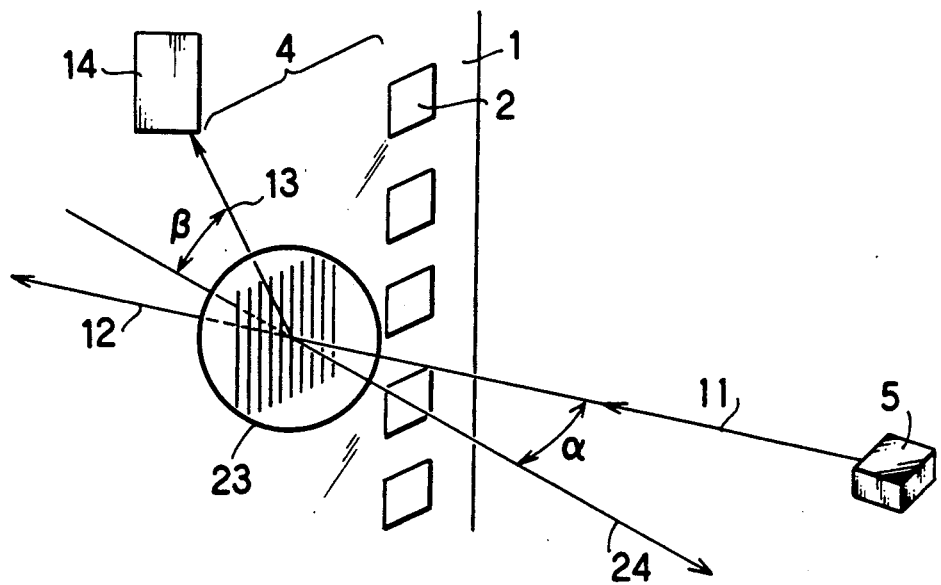
FIG. 5 is a block diagram showing a method according to one embodiment of the present invention for reproducing signals from a film.

In FIGS. 4 and 5, the same reference numerals are used for corresponding parts in FIG. 1 and their description is not given. FIG. 4 shows the constitution of the present invention at the time of recording, in which numeral 5 is a coherent light source, and numeral 10 denotes a driving circuit which drives the coherent light source 5. When the signal to be recorded is "1," the coherent light source 5 is on, and when the above-mentioned signal is "0," the coherent light source is off. Numeral 6 is a digital recording light signal produced from the coherent light source 5 and directly impinging vertically on the sound track section 4; numeral 8 denotes a mirror reflecting the recording light signal from the coherent light source 5; numeral 7 represents a recording light signal reflected by the mirror 8 and incident to the sound track section 4; $\theta$ represents an angle of incidence formed between the two recording light signals 6 and 7; and numeral 23 shows an enlarged interference band recorded in the sound track section 4.

FIG. 5 shows the constitution of the method according to the present invention at the time of reproduction, in which numeral 11 denotes reproduction light comprising coherent light emitted from the coherent light source 5; numeral 12 is the transmitted part of the reproduction light 11 that has passed the interference band; numeral 13 denotes the diffraction light produced by the diffractive action of this interference band 23 when the reproduction light 11 enters the interference band 23, and is detected by the light detector 14. Numeral 24 represents a vertical axis perpendicular to the surface of the film 1; $\alpha$ denotes an angle of incidence formed by the reproduction light 11 and the vertical axis 24; and $\beta$ is an angle of diffraction formed by the diffraction light 13 and the vertical axis 24.

Next, operation will be explained. In the recording mode, in FIG. 4, the coherent light source 5 is turned on and off by the driving circuit 10 in accordance with a signal to be recorded. The signal to be recorded is, for example, a digital aural signal and a time code signal for synchronizing the equipment with an external equipment. The recording light signal 6 emitted from the coherent light source 5 is directly vertically projected into the sound track section 4 of the film 1, and the recording light signal 7 reflected from the mirror 8 impinges at the angle of incidence $\theta$ in relation to the recording light signal 6. These two recording light signals 6 and 7 produce the interference band 23 of light in the sound track section 4. This interference band 23 is for recording and is recorded when the signal is "1" and is not recorded when the signal is "0." Let $\lambda$ be the wavelength of the recording light signals 6 and 7, and the pitch p of the interference band 23 will be $$p = \frac{\lambda}{\sin\theta} \tag{1}$$

In the reproduction mode, in FIG. 5, the reproduction light 11 being continuously emitted from the coherent light source 5 is projected onto the sound track section 4 at the angle of incidence $\alpha$. When the reproduction light 11 enters a part of the sound track section 4 where the interference band 23 is present, the interference band 23 acts as a diffraction grating of the pitch p, thereby producing the diffraction light 13 beside the transmitted light 12 at the angle of diffraction $\beta$. This diffractive phenomenon is expressed by the following equation.

$$\sin\alpha + \sin\beta = \frac{\lambda}{p} \tag{2}$$

Here, if the reproduction light 11 vertically enters the film 1, $\alpha = 0$, substituting Eq. 1 in Eq. 2 gives
$\sin\beta = \sin\theta \therefore \beta = \theta$ Therefore, there is produced the diffraction light 13 at the same angle of diffraction as the angle of incidence $\theta$. This diffraction light 13 is detected by the light detector 14, thereby obtaining the electrical signal "1." Also, when the reproduction light 11 has entered a portion of the sound track section 4 where the interference band 23 is not present, the diffraction light 13 will not be produced; only the transmitted light 12 exists. Accordingly, at this time, an electrical signal "0" is obtained from the light detector 14. According to the above-mentioned method, an original digital aural signal or a time code signal is obtainable by the use of the light detector 14. In the above-described embodiment, when an InGa semiconductor laser light source ($\lambda = 1$ $\mu$m) is used as the coherent light source 5 and the light enters at the angle of incidence of 30°, the pitch of the interference band 23 will become p=2 $\mu$m.

In the above-described embodiment, one kind of signal is recorded on, and reproduced from, one sound track section 4; however since the interference band 23 can be overlapped in the sound track section 4, it is possible to record multichannel digital aural signal or a time code signal. In this case, therefore, it is possible to reproduce the multichannel digital aural signal or a time code signal by using the light detector 14 on each of a plurality of optical axes corresponding to the angle of incidence $\theta$ in recording.

Figure 6:
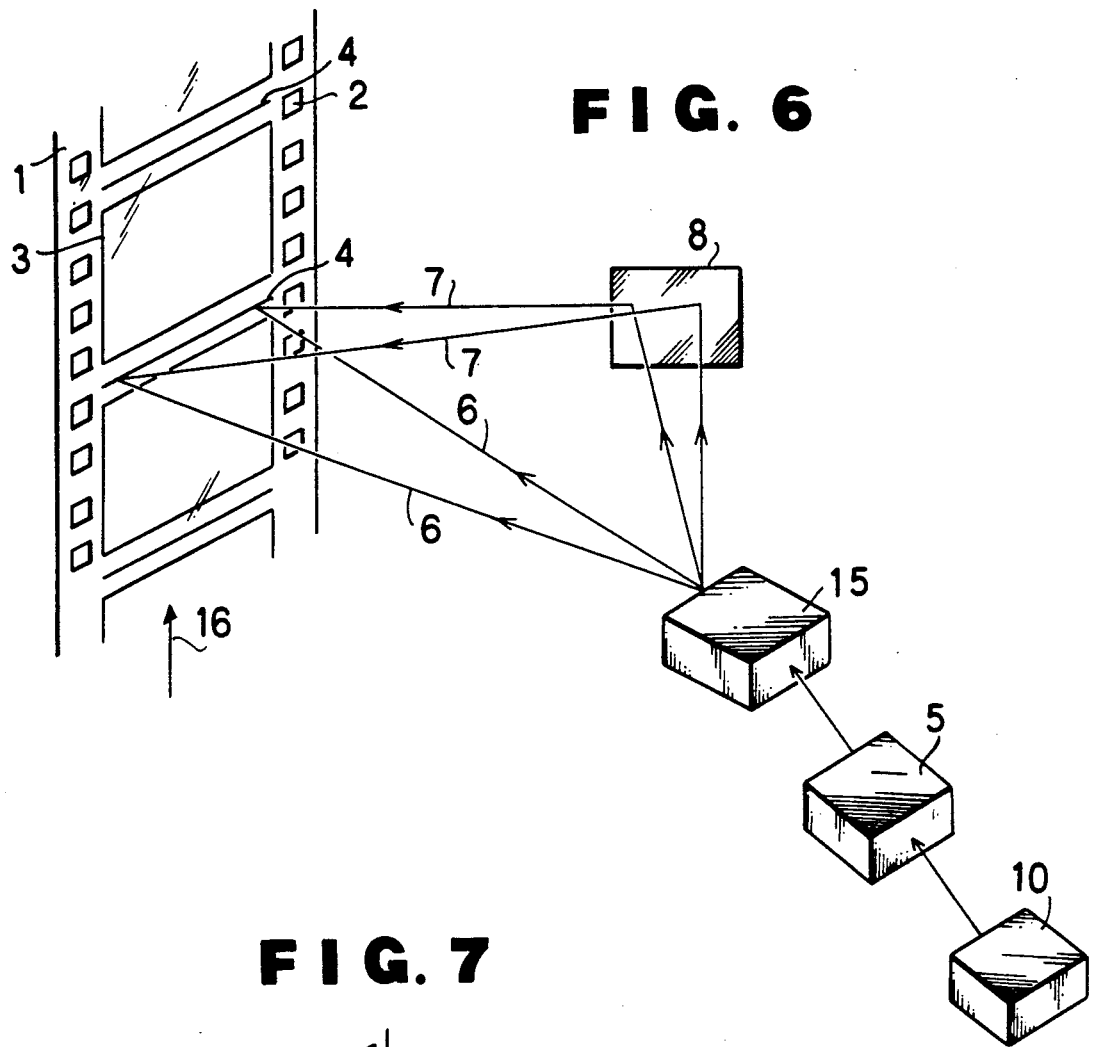
FIG. 6 is a block diagram showing a method according to another embodiment of the present invention for recording signals on a film.
Figure 7:
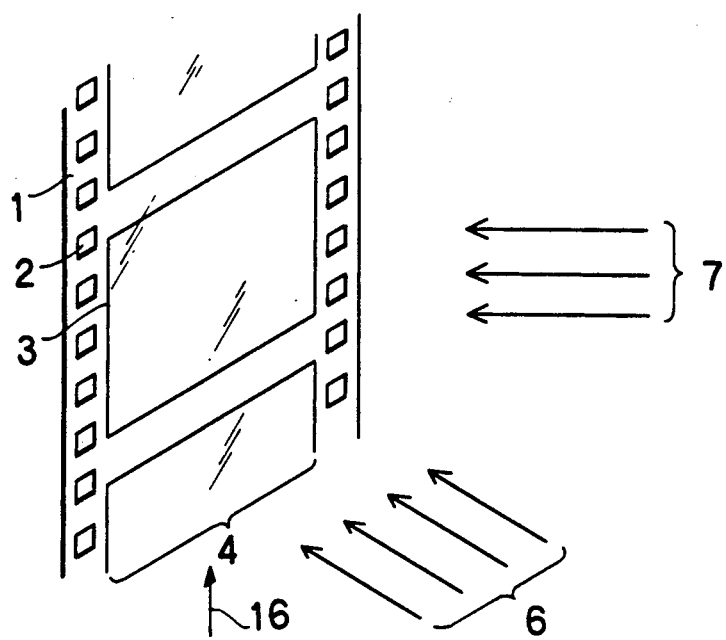
FIG. 7 is a block diagram showing a method according to further another embodiment of the present invention for recording signals on a film.

In the aforementioned embodiment, the sound track section 4 of the film 1 is shown in the same part as in the conventional film. However, as shown in FIG. 6, the recording light signals 6 and 7 which enter the film 1 from the coherent light source 5 can be projected onto the film 1 through a scan optical system 15 which disperses a beam of light vertically and horizontally, thereby setting the sound track section 4 in an arbitrary place other than the image frame 4, for example between the frames 3. In this case, at the time of reproduction, reproduction can be performed by scanning the reproduction light 11 on the sound track section 4 by means of the scanning optical system 15. Furthermore, in the above-mentioned embodiment, the sound track section 4 is provided in other part than the frame 3 on the film 1. It is, however, possible to overlap the sound track section 4 over the frame 3 as shown in FIG. 7 by setting the pitch p of the interference band 23 within a range invisible to the human eyes when the interference band is enlargedly projected on a screen, and also by setting the wavelength λ of the recording light signals 6 and 7 and the reproduction light 11 outside of a range visible to the human eye. For example, when a 18×24 mm frame 3 is projected onto a 10×15 m screen, using the aforementioned InGa semiconductor laser light source at the angle of incidence $\theta = 30°$, the pitch of the interference band 23 will become p=2 μm.

This p is of the size of about 1 mm, which has no resolution to naked eye.

According to the present invention, as described above, signals are recorded on the film in the form of a light interference band and reproduced; and therefore, the sound characteristics will not be changed by the type of film to be used, developing system, halation, flare, aberration of the optical system and so forth. Also when a copy is reproduced from the master film, optical copying suffices. Furthermore, since recording and reproduction is performed optically and in a non-contact manner, an extremely high-quality reproduction signal can be obtained without being adversely affected by the flatness of the film.

What is claimed is:

1. A method for digitally recording aural information in the form of binary digital signals on motion picture film comprising:
    turning on and off light in accordance with said binary digital signals to be recorded such that the "on" condition represents one digital logic state and the "off" condition represents the other digital logic state;
    producing an interference band of said light in accordance with said signals by diverting a part of said light and by rejoining said part of light that has been diverted after producing a phase difference therein to thereby produce a selected interference band of said light to be recorded in said "on" condition as said one digital logic state; and
    recording said selected interference band of light and the time related on-off pattern thereof on said motion picture film to form a recorded binary digital signal wherein said selected interference band is recorded during the "on" condition of said light and no recording of said selected interference band is made when said light is in the "off" condition.

2. A method for recording aural information in the form of binary digital signals on a motion picture film as claimed in claim 1, in which said light is coherent light from a laser light source.

3. A method for recording aural information in the form of binary digital signals on motion picture film as claimed in claims 1 or 2, further comprising:
    diverting a part of a plurality of different rays of light which are turned on and off and, after producing different phase difference in each of said diverted plurality of different rays of light, rejoining said part of said plurality of different rays of light to further produce different interference bands of light for each of said plurality of rays of light which are turned on and off; and
    further recording by overlapping said different interference bands of light along different optical axes at different angles of incidence on said motion picture film.

4. A method for recording aural information in the form of binary digital signals on motion picture film as claimed in any one of claims 1 or 2 including projecting and positionally scanning the recording interference band of light on said film in accordance with said signals, and recording said interference band in a selected position on said film.

5. A method for recording aural information in the form of binary digital signals on a motion picture film as claimed in claim 3, including positionally scanning the interference band of light on a film in accordance with said signals, and recording said interference band in a selected position on said film.

6. A method for reproducing aural information in the form of recorded digital signals from a motion picture film having an interference band acts as a diffraction grating, comprising:
    projecting reproduction light onto said motion picture film on which said digital signals have been recorded in the form of the presence of an interference band of light corresponding to one digital logic state and the absence of said interference band of light corresponding to the other digital logic state, and
    detecting the presence or absence of a diffraction light pattern of said reproduction light which is produced by a diffractive action of said interference band for obtaining a digital aural data.

7. A method for reproducing aural information in the form of recorded digital signals from a motion picture film as claimed in claim 6, in which said reproduction light is coherent light from a laser light source.

8. A method for reproducing aural information in the form of recorded digital signals from a motion picture film as claimed in claims 6 or 7, further comprising:
    further reproducing digital signals which have been recorded on said film in a plurality of different interference bands by impinging on said film a plurality of rays of diffraction light at different angles of incidence and detecting the reproduction light which is produced by the diffractive action of said different interference bands.

9. A method for reproducing aural information in the form of recorded digital signals from a motion picture film as claimed in any one of claims 6 or 7 including positionally scanning said reproduction light to control the position on said film from which said recorded digital signals are reproduced.

10. A method for reproducing aural information in the form of recorded digital signals from a motion picture film as claimed in claim 8 including positionally scanning said reproduction light to control the position on said film from which said recorded digital signals are reproduced.

* * * * *

UNITED STATES PATENT AND TRADEMARK OFFICE
CERTIFICATE OF CORRECTION

PATENT NO. : 5,101,397
DATED : March 31, 1992
INVENTOR(S) : Hidenori Banjo It is certified that error appears in the above-identified patent and that said Letters Patent is hereby corrected as shown below:

Column 6, line 6, "difference" should be --differences--.

Signed and Sealed this

Fourteenth Day of September, 1993

Attest:

BRUCE LEHMAN

Attesting Officer

Commissioner of Patents and Trademarks